United States Patent [19]

Craigen et al.

[11] 4,035,468

[45] July 12, 1977

[54] URANIUM DIOXIDE PROCESS

[75] Inventors: William J. S. Craigen; Tadeusz W. Zawidzki, both of Ottawa; Bruce C. Smart; Frank W. Melvanin, both of Port Hope, all of Canada

[73] Assignee: Eldorado Nuclear Limited, Canada

[21] Appl. No.: 661,819

[22] Filed: Feb. 26, 1976

[30] Foreign Application Priority Data

Mar. 4, 1975 Canada ............................ 221214

[51] Int. Cl.$^2$ ...................................... C01G 43/00
[52] U.S. Cl. ............................... 423/15; 423/253; 423/261
[58] Field of Search ................ 423/15, 253, 261

[56] References Cited

U.S. PATENT DOCUMENTS

| | | | |
|---|---|---|---|
| 3,129,055 | 4/1964 | Bel et al. | 423/261 |
| 3,168,371 | 2/1965 | St. Pierre | 423/261 |
| 3,342,562 | 9/1967 | St. Pierre | 423/261 |
| 3,372,999 | 3/1968 | Stevenson | 423/15 X |
| 3,393,055 | 7/1968 | Stevenson | 423/15 |
| 3,758,664 | 9/1973 | Gerrald | 423/261 X |
| 3,846,520 | 11/1974 | Bruijn et al. | 423/261 X |
| B 372,722 | 3/1976 | Fuller | 423/261 |

FOREIGN PATENT DOCUMENTS 1,355,689   1963   France

OTHER PUBLICATIONS

Galkin; N. P. et al., Technology of Uranium (AEC--tr-6638) pp. 23-24, 25-26, 39-40, Israel Program for Scientific Trans., 1966, available NTIS.
Grainger, L., Uranium and Thorium, pp. 67-68, George Newnes Ltd., London, 1958.
Woolfrey, J. L., Prep. and Calcination of Ammonium Urunates -- A Literature Survey (AAEC-TM-476) 1968, available NTIS, Star No. N70-35998.
Martin, F. S. et al., Uranium Dioxide Fabrication, in Chem. and Process Eng., July 1960, pp. 291-294, 303.

*Primary Examiner*—Richard E. Schafer
*Attorney, Agent, or Firm*—Wenderoth, Lind & Ponack

[57] ABSTRACT

Process for the preparation of fine particle size uranium dioxide from a uranium trioxide feed comprising the following steps:

a. reacting solid uranium trioxide with aqueous ammonium nitrate to form an insoluble ammonium uranate
b. neutralizing the thus formed slurry with ammonium hydroxide to precipitate out as an insoluble ammonium uranate the remaining dissolved uranium
c. recovering the thus formed precipitates in a dry state and
d. reducing the dried precipitate to uranium dioxide.

23 Claims, No Drawings

URANIUM DIOXIDE PROCESS

BACKGROUND OF THE INVENTION

This invention relates to the preparation of uranium dioxide.

Uranium dioxide ($UO_2$) is the fuel most commonly used in present day nuclear power reactors. In its final form the $UO_2$ must meet stringent chemical and density specifications, set by the nuclear industry to allow efficient, economical operation of the power reactors.

The most common method used to obtain the high densities required (>95% theoretical) is by cold pressing the powdered $UO_2$ into pellets and sintering in hydrogen at temperatures of at least 1600° C. Even under these conditions the $UO_2$ powder must have a very fine particle size before the sintered pellets will meet the density specification.

There are a number of different methods in use for producing $UO_2$ of very fine particle size. The method most commonly used is by hydrogen reduction of ammonium diuranate, (ADU), which is produced by ammonia precipitation from a solution of uranyl nitrate or uranyl fluoride. The ADU formed in this manner has a very fine particle size, which carries through to the $UO_2$. The effluent by-product formed is either ammonium fluoride or ammonium nitrate, which is soluble and is removed in the filtrate. Most other methods also involve formation of effluent by-products which must be disposed of. One method which does not produce any aqueous effluent involves hydrogen reduction of milled $UO_3$ powder to produce $UO_2$ of the desired particle size. An alternative to this is wet or dry grinding of the $UO_2$ after reduction.

SUMMARY OF THE INVENTION

This invention is based on the discovery of a method for preparing a very fine particle size $UO_2$ from a $UO_3$ feed with no by-product aqueous effluent and no grinding step required.

This invention provides a process for the preparation of fine particle size uranium dioxide from a uranium trioxide feed comprising the following steps:

a. reacting solid uranium trioxide with aqueous ammonium nitrate to form an insoluble ammonium uranate b. neutralizing the thus formed slurry with ammonium hydroxide to precipitate out as an insoluble ammonium uranate the remaining dissolved uranium c. recovering the thus formed precipitates in a dry state and d. reducing the dried precipitate to uranium dioxide.

DETAILED DESCRIPTION OF THE INVENTION

This process can be operated either batchwise or continuously; further, steps (a) to (c) can be operated continuously and step (d) batchwise, or conversely step (d) can be continuous and steps (a) to (c) batchwise. Thus any convenient combination of batchwise and continuous processing can be used. Similarly, it is convenient to recycle various of the process solutions or materials. Thus the ammonium nitrate liquor from step (c) remaining after the precipitate is removed, conveniently by filtration, can, after adjustment of either or both of its pH or concentration as desired, be returned to step (a). Conveniently this concentration is between about 50 and about 420 gm/liter, preferably between about 100 and 250 gm/liter. The ammonia released in the reduction of step (d) can be re-used in step (b).

Step (a) can be carried out at any convenient temperature, from room temperature, about 25° C, up to near boiling, about 100° C. Preferably the temperature is from about 60° to 100° C. The ratio of reactants is also quite flexible: a weight ratio of uranium trioxide to ammonium nitrate of between about 0.5:1 and 10:1 may be used. Preferably this weight ratio is below about 2:1.

Conveniently the solid precipitated ammonium uranate is recovered from the ammonium nitrate liquor in step (c) by filtration. We have ascertained it is preferable to carry out this filtration without cooling the reaction liquor. It is desirable to wash the precipitate, preferably with hot water.

Usually the uranium dioxide from step (c) is converted into pellets or agglomerates prior to reducing and sintering. This can be achieved by any convenient procedure. Conveniently the reduction is carried out in a hydrogen atmosphere, preferably at a temperature above about 400° C.

The following general comments apply to all of the subsequent Examples.

a. Uranium Trioxide

The nuclear grade $UO_3$ had the following physical and chemical characteristics.

Table 1

| Property | Physical Properties | | |
| | Typical Analysis | Screen Analysis | Weight % |
|---|---|---|---|
| Bulk Density | 2.5 g/cc | +100M | 17.8 |
|  |  | −100M | 8.9 |
| Tap Density | 4.1 g/cc | −200M | 46.6 |
| Surface Area | <3.5 m²/g (BET) | −325M | 26.6 |

Table 2. Chemical Analysis

Impurities in ppm of uranium present, analysed as $U_3O_8$. 'Maximum' column is limit acceptable at 96.0% oxide content; 'Typical' column is values generally found for the 97.0% oxide content material used.

| Impurity | Maximum | Typical |
|---|---|---|
| HCl insol | 1.0% | 0.05% |
| $H_2O$ | 1.0% | 0.50% |
| $NO_3$ | 0.85% | 0.50% |
| Ag | 1.0% | 0.1 |
| B | 0.2 | 0.15 |
| Cd | 0.2 | <0.2 |
| Cr | 10 | 5 |
| Cu | 50 | 1 |
| Fe | 30 | 25 |
| Mn | 5 | <1 |
| Mo | 1 | 0.5 |
| Ni | 15 | 5 |
| P | 50 | 10 |
| S | 500 | 300 |
| Si | 20 | <10 |
| Th | 50 | 30 |
| V | 30 | <10 | b. Ammonium nitrate and ammonia

Initial ammonium nitrate solutions were prepared either from reagent grade material, or by mixing reagent grade nitric acid and reagent grade ammonium hydroxide. Similarly, reagent grade ammonia or ammonium hydroxide was used when fresh material was required. When recycle ammonium nitrate is used both the pH and concentration are adjusted, if need be, by conventional procedures.

c. Product uranium dioxide assessment

The method used was to press the uranium dioxide powder to form green pellets and then sinter these pellets in a hydrogen atmosphere at a temperature of at least 1600° C. A "good" pellet has, amongst other properties, a sintered density of greater than 97% of the theoretical density of 10.96 gm/cc; that is, a density above 10.64 gm/cc after sintering. In the data given: G.D. = unsintered 'green' density S.D. = sintered density d. Experimental procedure

In Examples 1 to 9 the $UO_3$ was added to a well agitated heated tank containing the $NH_4NO_3$ solution at the desired temperature.

The pH of the slurry, recorded during the run, dropped to a minimum value in the range 2.5 to 4.0. The time required to obtain the minimum or equilibrium value was dependent on temperature and the $UO_3$ to $NH_4NO_3$ ratio. Slurry samples were taken at the end, and sometimes at the beginning or part way through the reaction. The slurry samples were checked for density and for soluble uranium. The ammonia content was determined on the filtered solution.

After the required reaction time, either aqueous (28%) or anhydrous ammonia was added to the slurry, and pH versus amount of ammonia added was recorded. After the ammonia addition, the slurry was usually repulped for 5 to 30 minutes prior to filtering in order to verify that the pH was not decreasing.

Filtration was carried out at temperatures up to 70° C and was much faster at temperatures above 50° C. Laboratory filtration rates, using a Buchner filter, varied from 0.5 to 1 gal/ft²/min above 50° C, to less than one-fourth of this figure below 50° C for approximately a three-fourths inch thick cake. Filtrate density and pH were measured. The solution pH was usually the same or slightly higher than the slurry pH and the density was slightly lower than the original $NH_4NO_3$ solution if aqueous ammonia addition was used for neutralization.

After washing with hot water the cake was dried at 110° C and the weight loss due to cake moisture recorded. In most cases weight loss and decomposition temperature to $U_3O_8$ were also determined on the powder. Finally the product was batch reduced and sintered in conventional production equipment. The green and sintered densities were determined geometrically. The results reported are the average of at least two pellets and are usually reproducible to ±0.02 g/cc. Some pellets were examined metallographically and some $UO_2$ samples were checked for O:U ratio and surface area.

Examples 1 – 5
Weight of $UO_3$ 750 g
Volume of solution 1500 ml
$NH_4NO_3$ concentration 250 g/l
w/o solids 31
$UO_3$:$NH_4NO_3$ ratio 2:1
Final pH adjusted to 7.5 with aqueous 28% $NH_4OH$.

| Example No. | Reaction Conditions | | $UO_2$ Product Analysis | |
|---|---|---|---|---|
| | Temp °C | Time hr | G.D. g/cc | S.D. g/cc |
| 1 | 25 | 24 | 5.08 | 10.72 |
| 2 | 60 | 2 | 5.16 | 10.61 |
| 3 | 80 | 2 | 5.04 | 10.64 |
| 4 | 80 | 1 | 5.09 | 10.68 |
| 5 | 90 | 1 | 5.07 | 10.63 |

Example 6
Weight of $UO_3$ 250 g
Volume of solution 500 ml
$NH_4NO_3$ concentration 400 g/l
w/o solids 30
$UO_3$:$NH_4NO_3$ ratio 1.25:1
Temperature, ° C 80
Time, hr 2
Final pH adjusted to 8.3 with aqueous $NH_4OH$.

| $UO_2$ Product | |
|---|---|
| G.D. g/cc | S.D. g/cc |
| 5.14 | 10.79 |

Examples 7,8
Weight of $UO_3$ 100 lb
Volume of solution 20 gal
$NH_4NO_3$ concentration 100 g/l
w/o solids 31
$UO_3$:$NH_4NO_3$ ratio 5:1
Temperature, ° C 85
Time, hr 2
Final pH adjusted to 7.5 with aqueous or anhydrous $NH_3$.

| Example No. | $UO_2$ Product | |
|---|---|---|
| | G.D. g/cc | S.D. g/cc |
| 7 | 5.01 | 10.62 |
| 8 | 5.20 | 10.71 |

Example 9
Weight of $UO_3$ 1500 lb
Volume of solution 565 gal
$NH_4NO_3$ concentration 200 g/l
w/o solids ~21
$UO_3$:$NH_4NO_3$ ratio 1.3:1
Temperature, ° C 90
Time, hr 2

| $UO_2$ Product | |
|---|---|
| G.D. g/cc | S.D. g/cc |
| 5.12 | 10.74 |

Many of the ammonium uranate precipitates were evaluated after drying by thermogravimetric and differential thermal analysis. Under the preferred conditions of production the TGA and DTA patterns indicate a very uniform product with reproducible decomposition and reduction properties. The $UO_2$ product has an O:U ratio after stabilizing in the range 2.10 to 2.20 and a surface area of 8 to 11 m²/g.

Metallographic examination of a limited number of sintered pellets indicated a uniform acceptable microstructure.

What I claim as my invention is:

1. Process for the preparation of fine particle size uranium dioxide from a uranium trioxide feed comprising the following steps:
   a. reacting solid uranium trioxide with aqueous ammonium nitrate to form an insoluble ammonium uranate;
   b. neutralizing the thus formed slurry with ammonium hydroxide to precipitate out as an insoluble ammonium uranate the remaining dissolved uranium;
   c. recovering the thus formed precipitates in a dry state, and
   d. reducing the dried precipitate to uranium dioxide.

2. Process according to claim 1 when operated batchwise.

3. Process according to claim 1 when operated continuously.

4. Process according to claim 1 wherein steps (a), (b), and (c) are operated batchwise.

5. Process according to claim 1 wherein steps (a), (b), and (c) are operated continuously.

6. Process according to claim 1 wherein ammonia released in step (d) is recycled to step (b) to provide the ammonium hydroxide.

7. Process according to claim 1 wherein the ammonium nitrate liquor remaining after recovering the insoluble ammonium uranate in step (c) is recycled for re-use in step (a).

8. Process according to claim 1 wherein the ammonium nitrate used in step (a) has a concentration from about 50 gm/liter to about 420 gm/liter.

9. Process according to claim 8 wherein the aqueous ammonium nitrate has a concentration from about 100 gm/liter to about 250 gm/liter.

10. Process according to claim 1 wherein step (a) is carried out at a temperature from about 25° C to about 100° C.

11. Process according to claim 10 wherein the temperature is from about 60° C to about 100° C.

12. Process according to claim 1 wherein the weight ratio of uranium trioxide to ammonium nitrate in step (a) is from about 0.5:1 to about 10:1.

13. Process according to claim 12 wherein the weight ratio of uranium dioxide to ammonium nitrate is below about 2:1.

14. Process according to claim 1 wherein the insoluble ammonium uranate is recovered by filtration.

15. Process according to claim 12 wherein the slurry is not cooled before filtration.

16. Process according to claim 14 wherein the filtered precipitate is water washed.

17. Process according to claim 14 wherein the filtered precipitate is hot water washed.

18. Process according to claim 1 wherein the reduction of step (d) is carried out in a hydrogen atmosphere.

19. Process according to claim 1 wherein step (c) includes a pelletizing operation.

20. Process according to claim 18 wherein the reduction is carried out at a temperature above about 400° C.

21. Process according to claim 15 wherein the filtered precipitate is water washed.

22. Process according to claim 15 wherein the filtered precipitate is hot water washed.

23. Process according to claim 19 wherein the reduction is carried out at a temperature above about 400° C.

* * * * *